US010711723B2

(12) United States Patent
Thomas et al.

(10) Patent No.: US 10,711,723 B2
(45) Date of Patent: Jul. 14, 2020

(54) FUEL CONTROL FOR DUAL FUEL ENGINES

(71) Applicant: Cummins Inc., Columbus, IN (US)

(72) Inventors: Robert J. Thomas, Indianapolis, IN (US); Axel Otto zur Loye, Columbus, IN (US); Christopher Pollitt, Mobile, AL (US); Robert C. Borregard, Charleston, SC (US)

(73) Assignee: Cummins Inc., Columbus, IN (US)

( * ) Notice: Subject to any disclaimer, the term of this patent is extended or adjusted under 35 U.S.C. 154(b) by 380 days.

(21) Appl. No.: 15/093,282

(22) Filed: Apr. 7, 2016

(65) Prior Publication Data

US 2016/0215723 A1 Jul. 28, 2016

Related U.S. Application Data

(63) Continuation of application No. PCT/US2014/060168, filed on Oct. 10, 2014.
(Continued)

(51) Int. Cl.
*F02D 41/26* (2006.01)
*F02D 19/06* (2006.01)
(Continued)

(52) U.S. Cl.
CPC ....... *F02D 41/263* (2013.01); *F02D 19/0647* (2013.01); *F02D 19/087* (2013.01); *F02D 41/0025* (2013.01); *F02D 41/0027* (2013.01); *F02D 41/0097* (2013.01); *F02D 41/021* (2013.01); *F02D 41/144* (2013.01);
(Continued)

(58) Field of Classification Search
CPC .............. F02D 19/0647; F02D 19/087; F02D 41/0025; F02D 41/144; F02D 41/1446; F02D 41/1497; F02D 41/3047; F02D 41/0027; F02D 41/0097; F02D 41/021; F02D 41/1454; F02D 41/1498;
(Continued)

(56) References Cited

U.S. PATENT DOCUMENTS 5,526,786 A * 6/1996 Beck .................... F02D 19/0605
123/27 GE
5,533,492 A * 7/1996 Willey ................ F02D 41/0027
123/488
(Continued)

FOREIGN PATENT DOCUMENTS

WO 2010089568 8/2010

OTHER PUBLICATIONS

International Search Report and Written Opinion, ISA/US, PCT Application No. PCT/US2014/060168, dated Jan. 26, 2015, 15 pgs.
(Continued)

*Primary Examiner* — Sizo B Vilakazi
(74) *Attorney, Agent, or Firm* — Taft Stettinius & Hollister LLP

(57) ABSTRACT

Systems and methods for controlling fuelling of dual fuel internal combustion engines are disclosed. The control techniques maximize the substitution rate of gaseous fuel for the liquid fuel by determining a target fuelling amount for the liquid fuel and then regulating an actual fuelling amount of the liquid fuel in response to engine speed and power variations and by modulating the flow rate of the gaseous fuel to the engine.

27 Claims, 5 Drawing Sheets

Related U.S. Application Data

(60) Provisional application No. 61/889,163, filed on Oct. 10, 2013.

(51) Int. Cl.

| | | |
|---|---|---|
| *F02D 41/14* | (2006.01) | |
| *F02D 41/00* | (2006.01) | |
| *F02D 19/08* | (2006.01) | |
| *F02D 41/30* | (2006.01) | |
| *F02D 41/02* | (2006.01) | |
| *F02D 35/02* | (2006.01) | |
| *F02M 26/05* | (2016.01) | |
| *F02M 26/06* | (2016.01) | |

(52) U.S. Cl.
CPC ..... *F02D 41/1446* (2013.01); *F02D 41/1454* (2013.01); *F02D 41/1497* (2013.01); *F02D 41/1498* (2013.01); *F02D 41/3047* (2013.01); *F02D 19/088* (2013.01); *F02D 35/025* (2013.01); *F02D 35/027* (2013.01); *F02D 41/1456* (2013.01); *F02D 2200/0404* (2013.01); *F02D 2200/0406* (2013.01); *F02D 2200/101* (2013.01); *F02D 2200/1004* (2013.01); *F02D 2200/703* (2013.01); *F02D 2250/18* (2013.01); *F02M 26/05* (2016.02); *F02M 26/06* (2016.02); *Y02T 10/128* (2013.01); *Y02T 10/36* (2013.01)

(58) Field of Classification Search
CPC .. F02D 41/263; F02D 19/088; F02D 41/1456; F02D 35/025
See application file for complete search history.

(56) References Cited

U.S. PATENT DOCUMENTS

| | | | |
|---|---|---|---|
| 5,937,800 A | 8/1999 | Brown et al. | |
| 7,222,015 B2 | 5/2007 | Davis et al. | |
| 9,790,869 B2 * | 10/2017 | Flynn | F02D 19/0642 |
| 2002/0078918 A1 | 6/2002 | Ancimer et al. | |
| 2007/0256648 A1 | 11/2007 | Sun et al. | |
| 2011/0132284 A1 | 6/2011 | Leone et al. | |
| 2013/0213363 A1 * | 8/2013 | Pruemm | F02D 41/3011 123/491 |
| 2014/0074380 A1 | 3/2014 | Fisher et al. | |
| 2014/0188372 A1 * | 7/2014 | Puckett | F02M 21/0281 701/104 |
| 2014/0373822 A1 * | 12/2014 | Rosswurm | F02D 41/0027 123/676 |

OTHER PUBLICATIONS

The State Intellectual Property Office of the People's Republic of China, First Office Action for corresponding Chinese patent application No. 201480061470.7, dated Jul. 12, 2018, 7 pgs.

The State Intellectual Property Office of the People's Republic of China, English Translation of Search Report for corresponding Chinese patent application No. 201480061470.7, dated Jul. 12, 2018, 9 pgs.

United Kingdom Examination Report; Intellectual Property Office; United Kingdom Application No. 1606125.1; dated Oct. 14, 2019; 4 pages.

* cited by examiner

FUEL CONTROL FOR DUAL FUEL ENGINES

CROSS-REFERENCE TO RELATED APPLICATION

The present application is a continuation of International Application No. PCT/US2014/060168, filed Oct. 10, 2014 which claims the benefit of U.S. Provisional Application Ser. No. 61/889,163 filed on Oct. 10, 2013, which are incorporated herein by reference in their entirety.

FIELD OF THE INVENTION

The present invention relates generally to dual fuel internal combustion engines, and more particularly is concerned with systems and methods for fuelling control of a dual fuel internal combustion engine.

BACKGROUND

An example dual fuel engine is an engine that includes a first fuel source that is utilized as the sole fuel source during certain operating conditions and a second fuel source that is integrated with the first fuel source at other operating conditions. In certain applications, the first fuel source is a diesel fuel and the second fuel source is natural gas. The diesel fuel provides, in some cases, the initial, low load levels of operation and is used for ignition for the natural gas at higher load operations. The substitution of natural gas for diesel fuel reduces the cost of operating the engine, particularly when the engine is employed at a location where natural gas is abundant or available at low cost.

When the engine is operating in dual fuel mode, natural gas fuel is introduced into the intake system. The air and natural gas mixture from the intake is drawn into the cylinder, just as it would be in a spark-ignited engine, but the air-to-fuel ratio of the charge mixture can be much leaner than a typical spark-ignited engine. Diesel fuel is injected near the end of the compression stroke, just as it would be in a traditional compression-ignition engine. The diesel fuel is ignited by energy compression heating of the charge and the energy released from combustion of the diesel fuel causes the natural gas to burn. A dual fuel engine can operate either entirely on diesel fuel or on the substitution mixture of diesel and natural gas, but generally cannot operate on natural gas alone except where an auxiliary ignition source is provided to the cylinder.

Dual fuel engines encounter difficulties during operation due to different compositions and variations in the natural gas that may be used for engine operation and in site conditions where the engine may be operated. In addition, existing control schemes have difficulty in achieving high substitution rates of natural gas for diesel fuel over a wide range of operating conditions and natural gas quality. While some control strategies compensate for natural gas quality variations by controlling gas substitution to obtain a desired air-to-fuel ratio, such approaches are limited by the ability to accurately measure and/or predict air flow rates, fuel properties, and sometimes gaseous fuel flow rates.

Other combustion strategies, such as pilot ignited gaseous fuel engines, utilize the diesel fuel only for pilot ignition of the gaseous fuel and air mixture. With this approach, the mixture of air and gaseous fuel must be carefully controlled to sustain combustion throughout the cylinder and away from the small diesel pilot ignition source. Extremely high substitution rates can be achieved, but these systems require intake air throttling and control in order to actively maintain required air-to-fuel ratios, and are limited to lower boost pressures, lower compression ratios, and lower power density than what can be achieved with unthrottled dual fuel compression ignition engine operation. In addition, the intake air throttling required for pilot-ignited gaseous fuel engines reduces the overall efficiency of the engine as compared to an unthrottled engine. Dual fuel engines are able to run with extremely lean charge air and gaseous fuel mixtures because the diffusion combustion of the diesel fuel creates turbulent regions of extremely high temperature within the cylinders that can drive oxidation reactions of the gaseous fuel even when the mixture is sol lean that it could not sustain the chain reactions or propagate a flame front from the ignition source.

SUMMARY

Unique systems and methods for controlling operation of dual fuel engines are disclosed that regulate the fuelling amount provided by a first fuel to a target value that is based on engine operating conditions and limits by modulating the flow rate of a second fuel to the engine. In one embodiment, the target value of the injection rate of the first fuel is a minimized value so the substitution rate of the second fuel for the first fuel is maximized. The requested engine speed and torque output (and thereby power output) is satisfied by modulating the fuelling amount of the first fuel to achieve the desired power output, and the flow of the second fuel is modulated to drive the fuelling amount of the first fuel to the target value while maintaining the desired power output. When the actual fuelling amount of the first fuel is more than the target value, the flow rate of the second fuel is increased, and when the fuelling amount of the first fuel is less than the target value, the flow rate of the second fuel is decreased. In one embodiment, the target value of the fuelling amount for the first fuel is held to a determined vale and the flow rate of the second fuel is modulated to achieve the desired speed and torque output of the engine.

In a further embodiment, an increase or decrease in second fuel flow rate results in the engine governor reducing or increasing the fuelling amount provided by the first fuel to maintain engine speed and/or torque. In one example, the control techniques provide duel fuel engine operations that maximize or increase the substitution rate of the second fuel for the first fuel in a manner that is independent of, or has improved response to, varying operating conditions, varying site conditions, variations in the second fuel, and changes in the intake air flow.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
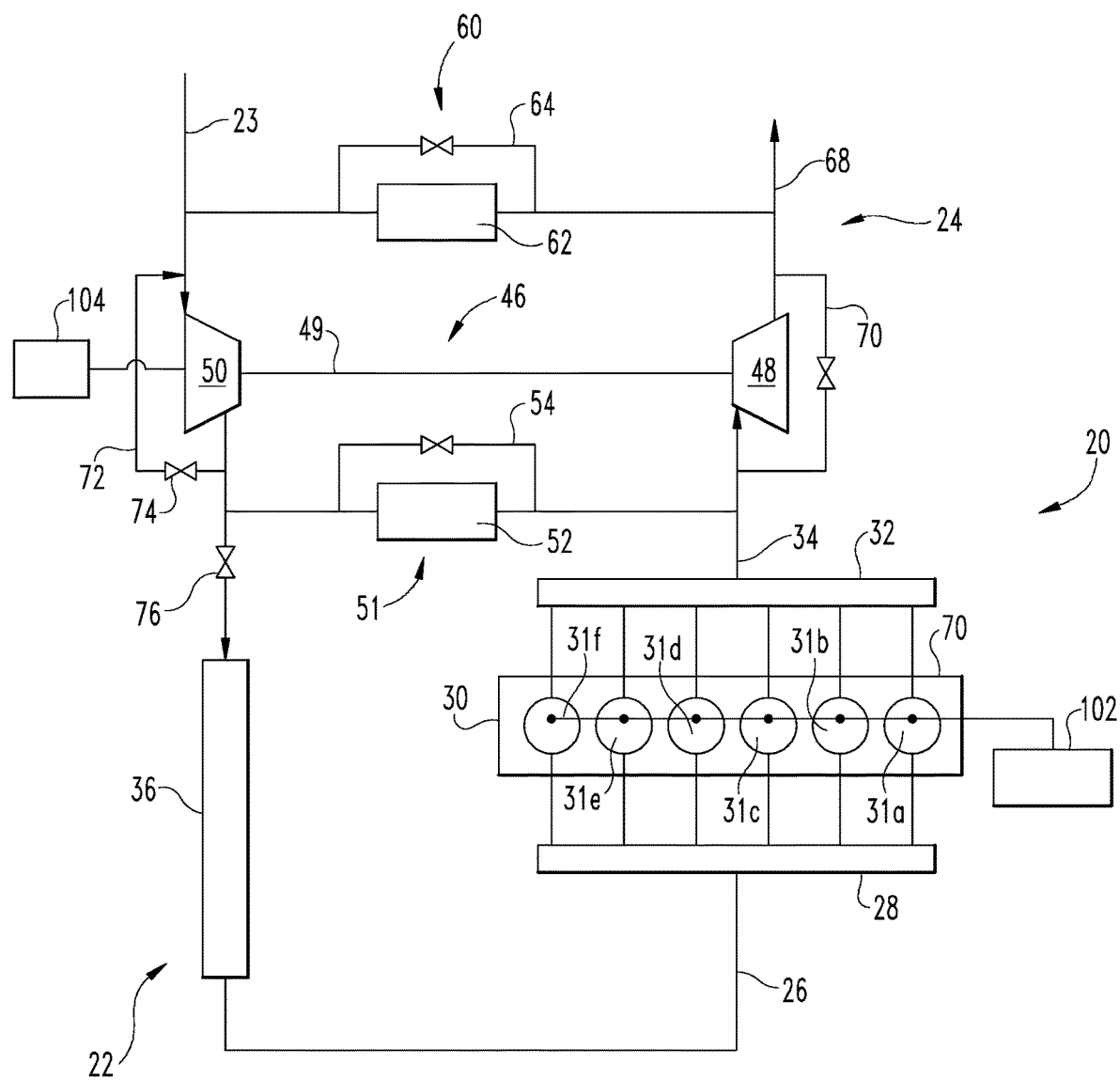
FIG. 1 is a schematic illustration of a portion of an internal combustion engine system with a dual fuel system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
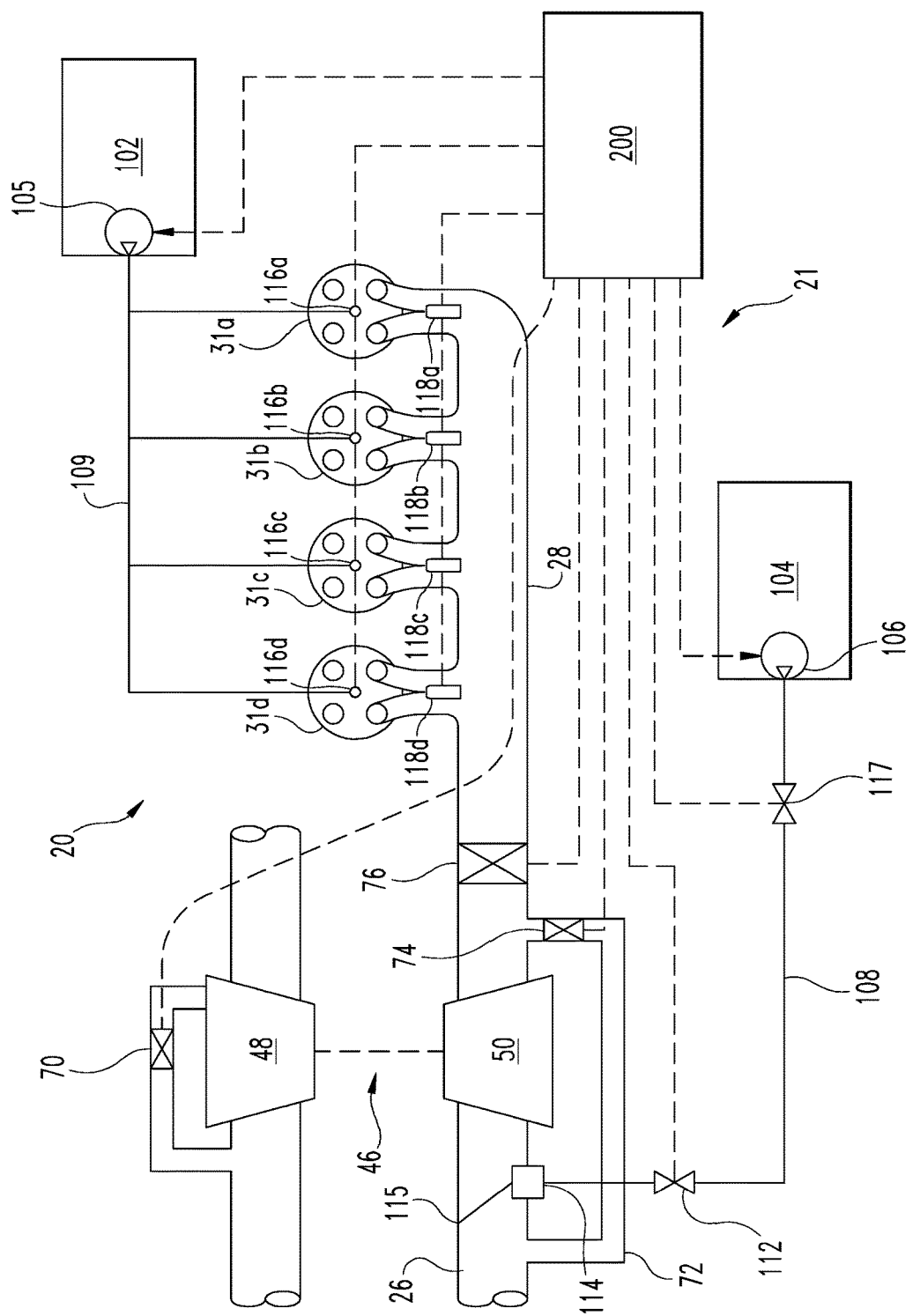
FIG. 2 is another schematic illustration of a part of the internal combustion engine system of FIG. 1 showing various embodiments of a dual fueling system.

With reference to FIGS. 1 and 2, an internal combustion engine system 20 is illustrated in schematic form. A fueling system 21 (FIG. 2) is also shown in schematic form that is operable with internal combustion engine system 20 to provide fueling for engine 30 from a first fuel source 102 and a second fuel source 104. Internal combustion engine system 20 includes engine 30 connected with an intake system 22 for providing a charge flow to engine 30 and an exhaust system 24 for output of exhaust gases. In certain embodiments, the engine 30 includes a lean combustion engine such as a diesel cycle engine that uses a primary or first fuel that is a liquid fuel such as diesel fuel and a secondary or second fuel that is a gaseous fuel such as natural gas. The second fuel can be, for example, natural gas, bio-gas, commercially available gas, methane, ethane, propane (LPG), butane, ethanol, producer gas, field gas, nominally treated field gas, well gas, nominally treated well gas, liquefied natural gas (LNG), compressed natural gas, landfill gas, condensate, coal-bed methane (CBM), liquid fuels that are readily vaporized (such as gasoline), and mixtures of these. However, other types of first and second fuels are not precluded, such as any suitable liquid fuel and gaseous fuel. In certain embodiments, the first fuel is a fuel suitable for lean burning, and the second fuel is a fuel that utilizes stoichiometric or near-stoichiometric combustion except when combined with the first fuel during a dual fueling operation. In the illustrated embodiment, the engine 30 includes six cylinders 31a-31f in an in-line arrangement. However, the number of cylinders (collectively referred to as cylinders 31) may be any number, and the arrangement of cylinders 31 may be any arrangement, and is not limited to the number and arrangement shown in FIG. 1.

Engine 30 includes an engine block 70 that at least partially defines the cylinders 31a, 31b, 31c, 31d, 31e, 31f (collectively referred to as cylinders 31.) A plurality of pistons (not shown) may be slidably disposed within respective cylinders 31 to reciprocate between a top-dead-center position and a bottom-dead-center position. Each of the cylinders 31, its respective piston, and the cylinder head form a combustion chamber. In the illustrated embodiment, engine 30 includes six such combustion chambers. However, it is contemplated that engine 30 may include a greater or lesser number of cylinders and combustion chambers and that cylinders and combustion chambers may be disposed in an "in-line" configuration, a "V" configuration, or in any other suitable configuration.

In one embodiment, engine 30 is a four stroke engine. That is, for each complete engine cycle (i.e., for every two full crankshaft rotations), each piston of each cylinder 31 moves through an intake stroke, a compression stroke, a combustion or power stroke, and an exhaust stroke. Thus, during each complete cycle for the depicted six cylinder engine, there are six strokes during which air is drawn into individual combustion chambers from intake supply conduit 26 and six strokes during which exhaust gas is supplied to exhaust manifold 32.

The engine 30 includes cylinders 31 connected to the intake system 22 to receive a charge flow and connected to exhaust system 24 to release exhaust gases produced by combustion of the first and/or second fuels in a charge in the cylinder provided by the charge flow. Exhaust system 24 may provide exhaust gases to a turbocharger 46, although a turbocharger is not required. In still other embodiments, multiple turbochargers are included to provide high pressure and low pressure turbocharging stages that compress the intake flow.

Furthermore, exhaust system 24 can be connected to intake system 22 with one or both of a high pressure exhaust gas recirculation (EGR) system 51 and a low pressure EGR system 60. EGR systems 51, 60 may include a cooler 52, 62 and bypass 54, 64, respectively. In other embodiments, one or both of EGR systems 51, 60 are not provided. When provided, EGR system(s) 51, 60 provide exhaust gas recirculation to engine 30 in certain operating conditions. In any EGR arrangement during at least certain operating conditions, at least a portion the exhaust output of cylinder(s) 31 is recirculated to the engine intake system 22. In the high pressure EGR system 51, the exhaust gas from the cylinder(s) 31 takes off from exhaust system 24 upstream of turbine 48 of turbocharger 46 and combines with intake flow at a position downstream of compressor 50 of turbocharger 46 and upstream of an intake manifold 28 of engine 30. In the low pressure EGR system 60, the exhaust gas from the cylinder(s) 31a-31f takes off from exhaust system 24 downstream of turbine 48 of turbocharger 46 and combines with intake flow at a position upstream of compressor 50 of turbocharger 46. The recirculated exhaust gas may combine with the intake gases in a mixer (not shown) of intake system 22 or by any other arrangement. In certain embodiments, the recirculated exhaust gas returns to the intake manifold 28 directly.

Intake system 22 includes one or more inlet supply conduits 26 connected to an engine intake manifold 28, which distributes the charge flow to cylinders 31 of engine 30. Exhaust system 24 is also coupled to engine 30 with an engine exhaust manifold 32. Exhaust system 24 may include an exhaust conduit 34 extending from exhaust manifold 32 to an exhaust valve. In the illustrated embodiment, exhaust conduit 34 extends to turbine 48 of turbocharger 46. Turbine 48 may include a valve such as controllable wastegate 70 or other suitable bypass that is operable to selectively bypass at least a portion of the exhaust flow from turbine 48 to reduce boost pressure, charge flow and engine torque under certain operating conditions. In another embodiment, turbine 48 is a variable geometry turbine with a size-controllable inlet opening. In other embodiments, the exhaust valve is an exhaust throttle and/or wastegate. While specific examples have been discussed, no particular form of intake or exhaust control valving is required, nor is the use of the same precluded.

An aftertreatment system (not shown) can be connected with an outlet conduit 68. The aftertreatment system may include, for example, oxidation devices (DOC), particulate removing devices (DPF, CDPF), constituent absorbers or reducers (SCR, AMOX, LNT), reductant systems, and other components if desired.

In one embodiment, exhaust conduit 34 is flow coupled to exhaust manifold 32, and may also include one or more intermediate flow passages, conduits or other structures. Exhaust conduit 34 extends to turbine 48 of turbocharger 46. Turbocharger 46 may be any suitable turbocharger known in the art, including fixed-geometry turbochargers, variable-geometry turbine turbochargers and waste-gated turbochargers. Turbocharger 46 may also include multiple turbochargers. Turbine 48 is connected via a shaft 49 to compressor 50 that is flow coupled to inlet supply conduit 26.

Compressor 50 receives fresh air flow from intake air supply conduit 23. Second fuel source 104 may also be flow coupled at or upstream of the inlet to compressor 50 or downstream of compressor 50, as discussed further below. Intake system 22 may further include a compressor bypass 72 that connects a downstream or outlet side of compressor 50 to an upstream or inlet side of compressor 50. Compressor bypass 72 includes a control valve 74 that is selectively opened to allow charge flow to be returned to the inlet side of compressor 50 to reduce compressor surge under certain operating conditions, such as when an intake throttle 76 is closed. Inlet supply conduit 26 may include a charge air cooler 36 downstream from compressor 50 and intake throttle 76. In another embodiment, a charge air cooler 36 is located in the intake system 22 upstream of intake throttle 76. Charge air cooler 36 may be disposed within inlet air supply conduit 26 between engine 30 and compressor 50, and embody, for example, an air-to-air heat exchanger, an air-to-liquid heat exchanger, or a combination of both to facilitate the transfer of thermal energy to or from the flow directed to engine 30.

In operation of internal combustion engine system 20, fresh air is supplied through inlet air supply conduit 23. The fresh air flow or combined flows can be filtered, unfiltered, and/or conditioned in any known manner, either before or after mixing with the EGR flow from EGR systems 51, 60 when provided. The intake system 22 may include components configured to facilitate or control introduction of the charge flow to engine 30, and may include intake throttle 76, one or more compressors 50, and charge air cooler 36. The intake throttle 76 may be connected upstream or downstream of compressor 50 via a fluid passage and configured to regulate a flow of atmospheric air and/or combined air/EGR flow to engine 30. Compressor 50 may be a fixed or variable geometry compressor configured to receive air or air and fuel mixture from fuel source 104 and compress the air or combined flow to a predetermined pressure level before engine 30. The charge flow is pressurized with compressor 50 and sent through charge air cooler 36 and supplied to engine 30 through intake supply conduit 26 to engine intake manifold 28.

With further reference to FIG. 2, fuel system 21 is configured to provide dual fuelling of engine 30. Only four cylinders 31*a*, 31*b*, 31*c*, 31*d* are shown in FIG. 2, it being understood that if additional cylinders, such as cylinders 31*e* and 31*f*, or fewer cylinders, are provided they are arranged in a manner similar to the illustrated cylinders 31. Fuel system 21 includes first fuel source 102 and second fuel source 104. First fuel source 102 is configured to provide a flow of a first fuel to cylinders 31 with one or more injectors at or near each cylinder. Second fuel source 104 is connected to intake system 22 with a mixer or connection at or adjacent an inlet of compressor 50. In certain embodiments, the cylinders 31 each include at least one direct injector for delivering fuel to the combustion chamber thereof from a first fuel source, such as first fuel source 102. In addition, at least one of a port injector at each cylinder or a mixer at an inlet of compressor 50 can be provided for delivery or induction of fuel from the second fuel source 104 with the charge flow delivered to cylinders 31.

The fueling from the first fuel source 102 is controlled to provide the sole fueling at certain operating conditions of engine 30, and fueling from the second fuel source 104 is provided to substitute for fueling from the first fuel source 102 at other operating conditions to provide a dual flow of fuel to engine 30. In embodiments where the first fuel source 102 is diesel fuel and the second fuel source 104 is natural gas, a control system including controller 200 is configured to control the flow of liquid diesel fuel from first source 102 and the flow of gaseous fuel from second source 104 in accordance with, for example, engine speed, engine loads, intake manifold pressures, and fuel pressures, as discussed further below.

A direct injector, as utilized herein, includes any fuel injection device that injects fuel directly into the cylinder volume, and is capable of delivering fuel into the cylinder volume when the intake valve(s) and exhaust valve(s) are closed. The direct injector may be structured to inject fuel at the top of the cylinder or laterally of the cylinder. In certain embodiments, the direct injector may be structured to inject fuel into a combustion pre-chamber. Each cylinder 31 may include one or more direct injectors 116*a*-116*d*, respectively. The direct injectors 116*a*-116*d* may be the primary fueling device for first fuel source 102 for the cylinders 31.

A port injector, as utilized herein, includes any fuel injection device that injects the second fuel outside the engine cylinder in the intake manifold to form the air-fuel mixture. The port injector injects the fuel towards the intake valve. During the intake stroke, the downwards moving piston draws in the air/fuel mixture past the open intake valve and into the combustion chamber. Each cylinder 31*a*, 31*b*, 31*c*, 31*d* may include one or more port injectors 118*a*, 118*b*, 118*c*, 118*d*, respectively. In one embodiment, the port injectors 118*a*-118*d* may be the primary fueling device for second fuel source 104 to the cylinders 31. In another embodiment, the second fuel source 104 can be connected to intake system 22 with a mixer 115 at a gaseous fuel connection 114 upstream of intake manifold 28, such as at the inlet of or upstream of compressor 50. A flow control valve 117 can be provided to control the flow of gaseous fuel to engine 30 from second fuel source 104.

In certain embodiments, each cylinder 31 includes at least one direct injector that is capable of providing all of the designed fueling amount of the first fuel from first fuel source 102 for the cylinders 31 at any operating condition. Second fuel source 104 provides a flow of a second fuel to each cylinder 31 through a port injector or a natural gas connection upstream of intake manifold 28 to provide a second fuel flow to the cylinders 31 to achieve desired operational outcomes, such as improved efficiency, improved fuel economy, improved high load operation, and other outcomes. In certain embodiments, a second direct injector is provided at each cylinder 31 for direct injection of the second fuel.

One embodiment of system 20 includes fuel system 21 with at least one fuel source 102 to provide a first fuel flow to all the cylinders 31 and a second fuel source 104 that provides a second fuel flow to all the cylinders 31 in addition to the first fuel flow under certain operating conditions. First fuel source 102 includes a first fuel pump 105 that is connected to controller 200, and the second fuel source 104 includes, in certain embodiments, a second fuel pump 106 that is connected to controller 200. However, embodiments in which a second fuel pump is not required are also contemplated. Each of the cylinders 31 includes an injector, such as direct injectors 116a-116d associated with each of the illustrated cylinders 31a-31d of FIG. 2. Direct injectors 116a-116d are electrically connected with controller 200 to receive fueling commands that provide a fuel flow to the respective cylinder 31 in accordance with a fuel command determined according to engine operating conditions and operator demand by reference to fueling maps, control algorithms, or other fueling rate/amount determination source stored in controller 200. First fuel pump 105 is connected to each of the direct injectors 116a-116d with a first fuel line 109. First fuel pump 105 is operable to provide a first fuel flow from first fuel source 102 to each of the cylinders 31a-31d in a rate, amount and timing determined by controller 200 that achieves a desired power and exhaust output from cylinders 31.

If provided, second fuel pump 106 is connected to the inlet of compressor 50 with gaseous fuel connection 114 with a second fuel line 108 or to port injectors 118. A shutoff valve 112 can be provided in fuel line 108 and/or at one or more other locations in fuel system 21 that is connected to controller 200. Second fuel pump 106 is operable to provide a second fuel flow from second fuel source 104 in an amount determined by controller 200 that achieves a desired power and exhaust output from cylinders 31. In another embodiment, second fuel pump 106 is omitted and fuel is supplied to connection 114 or port injectors 118 under pressure from a pressurized second fuel source 104, and the flow of gaseous fuel from second fuel source 104 is controlled by flow control valve 117.

Controller 200 can be connected to actuators, switches, or other devices associated with fuel pumps 105, 106, shutoff valve 112, intake throttle 76, compressor bypass valve 74, shutoff valve 112, flow control valve 117, wastegate 70 and/or injectors 116, 118 and configured to provide control commands thereto that regulate the amount, timing and duration of the flows of the first and second fuels to cylinders 31, the charge flow, and the exhaust flow to provide the desired power and exhaust output. The positioning of each of shutoff valve 112, flow control valve 117, intake throttle 76, compressor bypass valve 74, wastegate 70, injectors 116, 118 and/or the on/off status of fuel pumps 105, 106 can be controlled via control commands from controller 200.

In certain embodiments of the systems disclosed herein, controller 200 is structured to perform certain operations to control engine operations and fueling of cylinders 31 with fueling system 21 to provide the desired speed and torque outputs. In certain embodiments, the controller 200 forms a portion of a processing subsystem including one or more computing devices having memory, processing, and communication hardware. The controller 200 may be a single device or a distributed device, and the functions of the controller 200 may be performed by hardware or instructions provided on a computer readable medium. The controller 200 may be included within, partially included within, or completely separated from an engine controller (not shown). The controller 200 is in communication with any sensor or actuator throughout the systems disclosed herein, including through direct communication, communication over a datalink, and/or through communication with other controllers or portions of the processing subsystem that provide sensor and/or actuator information to the controller 200.

Certain operations described herein include operations to determine one or more parameters. Determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the parameter can be calculated, and/or by referencing a default value that is the parameter value.

The schematic flow description which follows provides an illustrative embodiment of a method for controlling fuelling during a dual fuelling mode of operation of internal combustion engine system 20. As used herein, a dual fuel system 21 is a fueling system in which a dual fueling mode is provided where each of the cylinders 31 of engine 30 receives a first fuel flow and a second fuel flow in addition to the first fuel flow under certain operating conditions. However, it is contemplated that the dual fueling system 21 can be operated in a single fuel mode from first fuel source 102 upon operator selection or certain operating conditions. Operations illustrated are understood to be exemplary only, and operations may be combined or divided, and added or removed, as well as re-ordered in whole or part, unless stated explicitly to the contrary herein. Certain operations illustrated may be implemented by a computer such as controller 200 executing a computer program product on a non-transient computer readable storage medium, where the computer program product comprises instructions causing the computer to execute one or more of the operations, or to issue commands to other devices to execute one or more of the operations.

Figure 3:
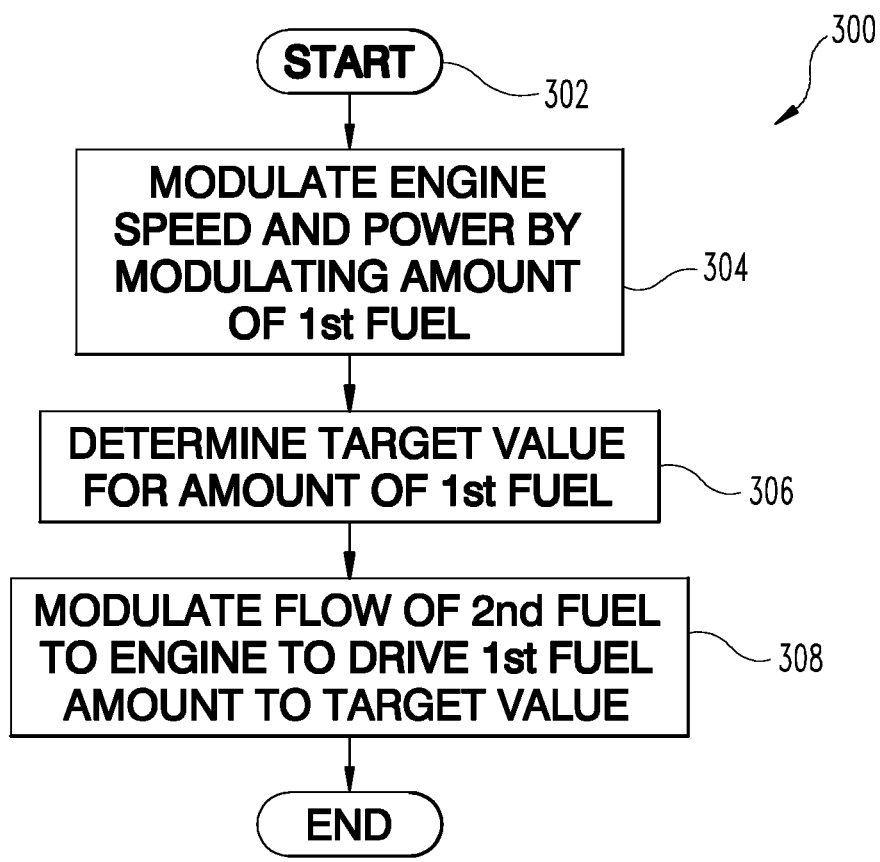
FIG. 3 is a flow diagram of procedures for duel fuel operation of an internal combustion engine.

In FIG. 3, one embodiment of a flow diagram for operating engine 30 with dual fuel system 21 is disclosed. The disclosed procedure 300 includes operations for a dual fuel engine fuel control method in one embodiment that regulates the amount of the first fuel provided during operation to a minimized value based on engine operating conditions and limits by modulating the flow rate of the gaseous second fuel to the engine 30. In another embodiment, dual fuel engine fuel control method modulates the amount of the first fuel provided during engine operation to respond to changes in a speed and/or torque request to the engine 30 while the flow rate of the second fuel is simultaneously adapted to bring the amount of the first fuel to a target value.

The fuel control procedure 300 can be used during dual fuel engine operation where a self-combusting first fuel (e.g. having a high "cetane" value) is injected or otherwise provided into a premixed charge of air and another self-combusting resistant vaporized second fuel (e.g. having a high "octane" value) that has been compressed sufficiently to auto-ignite the injected first fuel, and the first fuel then becomes the ignition source for the air and gaseous second fuel mixture. One application is for dual fuel operation of a compression ignition engine with diesel fuel as the first fuel and natural gas, propane, or other suitable fuel as the premixed gaseous second fuel that is provide to the combustion chambers of the cylinders. In a specific embodiment, the procedure has application in operating conditions where a gaseous second fuel and air mixture is too lean to be able to burn effectively in the engine without a substantial diffusion combustion from the injection of a diesel-type first fuel. In an example embodiment, the procedure has application in operating conditions where the first fuel is provided in an amount greater than a pilot injection amount. In another embodiment, the first fuel is provided in amount that is greater than an amount that is merely sufficient to provide an ignition source for the second fuel. Any described applications of the procedure are non-limiting examples.

Procedure 300 starts at 302 upon, for example, starting of engine 30. During dual fuel operation of the engine, procedure 300 includes an operation 304 to modulate engine speed and torque by modulating the amount of the first fuel that is provided to the cylinders by, for example, modulating an injection rate, quantity, timing, or duration of the first fuel. Operation 304 can be performed, for example, in response to a transient condition where engine speed and/or torque are not operating in steady state.

Procedure 300 further includes an operation 306 to determine a target value or fuelling amount for the first fuel after modulating the amount of the first fuel that is provided to modulate engine speed and torque. In one embodiment, the target fuelling amount is a minimum value based on a minimum charge air-fuel ratio for the first fuel that provides a desired or required air-to-fuel ratio of the first fuel to support auto-ignition of the first fuel and combustion of the second fuel when mixed with the air and gaseous fuel in the combustion chamber. In another embodiment, the target fuelling amount is a minimum value based on the minimum engine speed to be provided by combustion of the first fuel. Other embodiments contemplate adjustments in the minimum charge air-fuel ratio in determining the target fuelling amount. For example, the charge air-fuel ratio can be adjusted to provide a minimum amount of the first fuel based on one or more of engine speed conditions (e.g. speed and load), fuel injector tip temperature, intake manifold temperature, intake manifold pressure, cylinder knock level, and exhaust temperature. Non-limiting considerations to determine the minimum amount of the first fuel include: temperature limits of various engine components (intake manifold, exhaust manifold, turbocharger inlet, EGR cooler or flow path), empirical knowledge of engine knock limits and/or input from a "knock" sensor or other knock determination, fuel injector tip limits and fuel injection cooling characteristics, turbocharger speed limits, adjustments to any of these values experienced at altitude, and/or the tolerances in any of these values due to part-to-part variation or limitations in sensed value precision or accuracy.

After determining the target fuelling amount for the first fuel, procedure 300 continues at operation 308 and modulates the flow of gaseous second fuel to the engine to drive the amount of the first fuel to the target fuelling amount while delivering the desired torque and speed output from the engine. For example, when the amount of fuelling provided by the first fuel is greater than the target fuelling amount, the flow rate of the gaseous second fuel is increased. As a result of the increase in the flow rate of the gaseous second fuel, the engine governor responds by reducing the amount of the first fuel that is provided to maintain engine speed and torque output. When the amount of the first fuel is less than the target fuelling amount, the flow rate of the gaseous second fuel is decreased, and the engine governor responds by increasing the amount or flow rate of second fuel that is provided to maintain engine speed/power output. In one embodiment, operation 308 includes modulating the flow rate of the second fuel in response to a measured engine speed varying from a target or desired engine speed. In yet another embodiment, the engine is operated in a lean condition while changing the fuelling amount provided by the first fuel to respond to the changes in speed and torque of the engine and while modulating the flow rate of the second fuel.

Additionally or alternatively, when the amount of the first fuel is at or approaching the target fuelling amount, the controller may stop increasing or stop decreasing the flow rate of the second fuel, either to ensure a smooth transition into the target fuelling amount, and/or to allow for control space with the amount of the first fuel (e.g. room to decrease or increase the first fuel amount) during transient behavior. In certain embodiments, the target fuelling amount of the first fuel may be adjusted during transient or steady state behavior of the engine, and/or to provide a margin above the target fuelling amount of the first fuel, and operations for providing the flow rate of the second fuel are correspondingly adjusted or may be adjusted during transient or steady state behavior of the engine. An example embodiment includes increasing the target fuelling amount for the first fuel during transient behavior, and another example embodiment includes increasing the margin above the target fuelling amount for the first fuel during transient behavior. In either embodiment, operations for providing the flow rate for the second fuel are adjusted or may be adjusted during transient behavior of the engine.

The engine is more capable to produce a transient reduction in torque, and a transient of a greater magnitude, at high speed and/or load conditions. Examples of high speed and/or load conditions include speed or loads greater than 75% of maximum speed or load in one embodiment, or at speed or loads greater than 50% of maximum speed or load in another embodiment. In certain embodiments, the target fuelling amount for the first fuel may be adjusted during high speed or high load conditions of the engine, and/or any margin above the target fuelling amount for the first fuel may be adjusted, and operations for providing the flow rate for the second fuel are adjusted or may be correspondingly adjusted during high speed or load conditions of the engine. An example embodiment includes increasing the target fuelling amount for the first fuel during high speed and/or load conditions, and another example includes increasing the margin above the target fuelling amount of the first fuel, and operations for providing the flow rate for the second fuel are adjusted or may be adjusted during such high speed and/or load conditions. In one example embodiment, procedure 300 maintains the mean fuelling amount provided by the first fuel at the target fuelling amount while allowing for instantaneous changes to the amount of first fuel that is provided to respond to engine speed and power output requirements.

Since the engine governor instantaneously changes the amount of first fuel that is provided in response to engine speed and load changes, the transient and steady state performance of the engine when operating on both the first and second fuels will substantially be the same as the performance achieved when operating the engine on the first fuel only. In addition, since the amount of first fuel that is provided can be controlled to a target fuelling amount that is based on a lowest allowable or desired level, the maximum possible substitution rate of the second fuel for the first fuel can be achieved for all operating conditions. Utilizing the target fuelling amount for the first fuel amount as a setpoint and the actual amount of first fuel provided as feedback input, the flow rate of gaseous second fuel is modulated to achieve the target value for the amount of the first fuel, which eliminates the need for setup adjustments in the fuel substitution control scheme in different applications and gaseous fuel types, and automatically adjusts for different gaseous fuel characteristics, site conditions, and other sources of variation.

Dual fuel operations according to the systems and methods disclosed herein introduce the gaseous second fuel into the intake system of a compression ignition engine in order to reduce operating costs of the engine by substituting a lower cost gaseous second fuel and reducing the consumption of higher cost first fuel. Maximum costs saving benefits are achieved by maximizing the substitution of gaseous fuel and minimizing the liquid fuel consumption as disclosed herein. By regulating the amount of the first fuel that is provided during operation to a target fuelling amount that corresponds to a minimum value required to maintain acceptable performance and mechanical characteristics of the engine hardware, maximum substitution of the gaseous second fuel and therefore operating cost savings are achieved. Furthermore, the flow rate of the second gaseous fuel can be regulated with flow control valve 117 from the second fuel source 104. As a result, throttling of intake air flow in the intake system is not required since active control of the air-to-fuel ratio of the intake air flow to the second fuel is not required. However, charge flow control is not precluded, such as can be provided with an intake throttle, wastegate, and/or compressor bypass.

Figure 4:
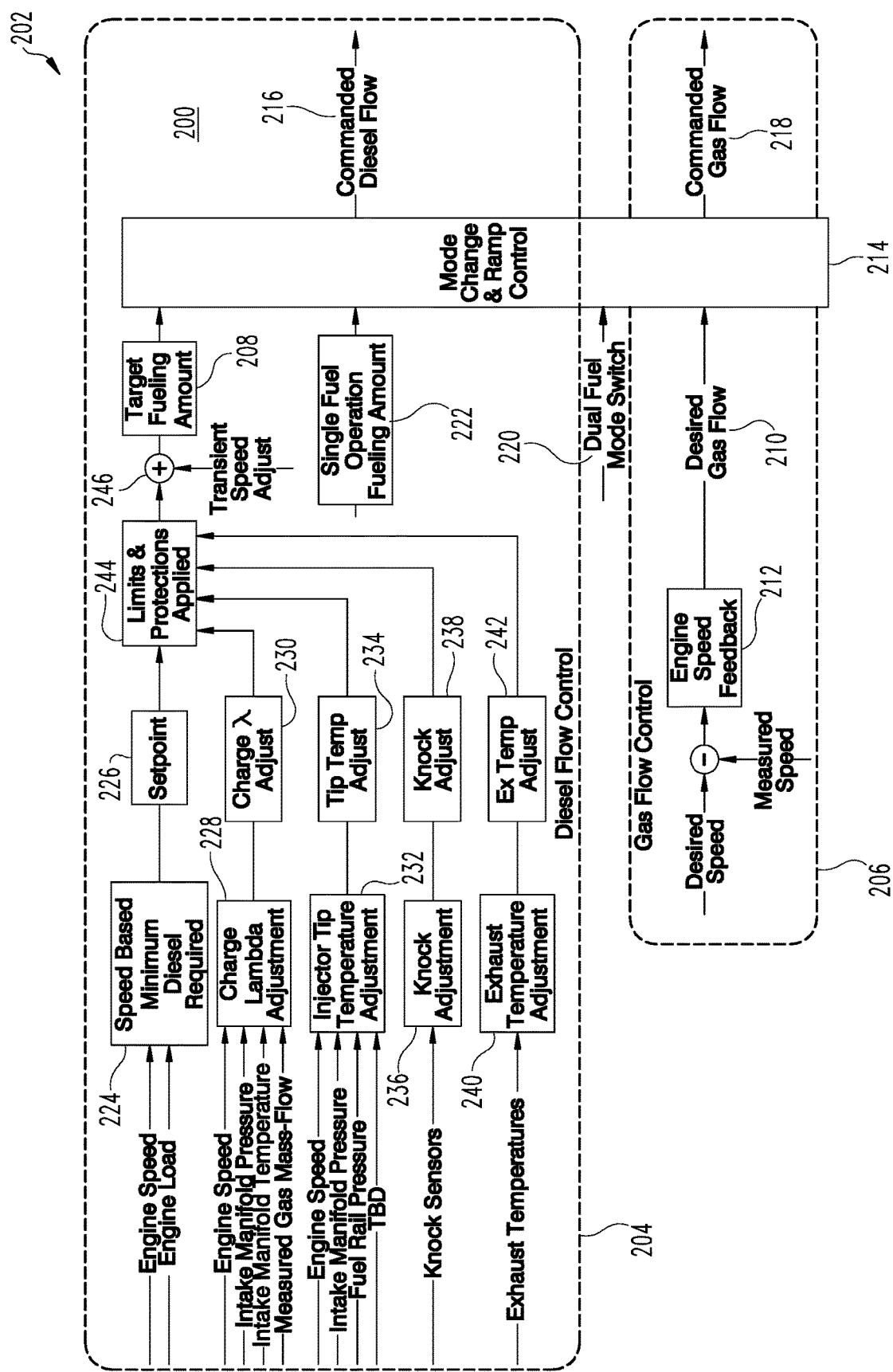
FIG. 4 is a schematic of one embodiment of a control apparatus for duel fuel operation of an internal combustion engine where a fuelling amount for the first fuel is maintained at a target value and the flow rate of the second fuel is modulated to satisfy a desired engine performance.

Referring to FIG. 4, there is shown one embodiment of a control apparatus 202 including, for example, controller 200. Control apparatus 202 includes a first fuel flow control module 204 and a second fuel flow control module 206. In certain embodiments, the controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

First fuel control module 204 receives a number of inputs from operation of system 20. Example inputs include engine operating parameters such as engine speed, engine load, intake manifold temperature, intake manifold pressure, measured gas (second fuel) mass flow, fuel rail pressure, knock sensors, exhaust gas temperatures, and aftertreatment device/system temperatures. First fuel flow control module 204 processes these inputs and/or by referring to a reference table based on these inputs to determine a desired or target fuelling amount 208 that, in the embodiment of FIG. 4, corresponds to a minimum fuelling amount to be provided by the first fuel from first fuel source 102. Second fuel flow control module 206 receives inputs of desired speed and measured speed of engine 30. Second fuel flow control module 206 processes these inputs by, for example, an engine speed feedback controller 212 and determines a desired or target flow rate 210 for the second fuel from second fuel source 204.

The target fuelling amount 208 in one embodiment is a minimum fuelling amount, or the minimum diesel required (MDR) in an embodiment in which the first fuel is diesel fuel, for the first fuel and target flow rate 210 for the second fuel are provided to a fuelling command module 214 that processes these values for mode changes and ramp control to provide a commanded fuelling amount 216 for the first fuel and a commanded flow rate 218 for the second fuel. Fuelling command module 214 can also receive inputs from a dual fuel mode switch 220 that can be manipulated by the operator or via an input command from controller 200 or another controller to select a single fuelling mode for engine operation with only the first fuel, or a dual fuel mode for engine operation with the first fuel and the second fuel. Fuelling command module 214 modifies the target fuelling amount 208 for the first fuel and target flow rate 210 for the second fuel according to the mode selection. If fuelling only with the first fuel is selected, fuelling command module 214 receives a single fuel operation fuelling amount 222 for the first fuel determined according to any suitable fuel control and fuel amount determination methodology. In addition, fuelling command module 214 modifies or modulates the target fuelling amount 208 of the first fuel and target flow rate 210 of the second fuel for ramp control to manage transitions in achieving the commanded fuelling amount and flow rate from a current fuelling amount and flow rate.

First fuel flow control module 204 includes a number of sub-modules that determine a target fuelling amount 208 for the amount of the first fuel that corresponds to a minimum fuelling amount of the first fuel to respond to various operating conditions of system 20. For example, engine speed sub-module 224 receives an engine speed input and engine load input, and determines a setpoint reference value 226 for the target fuelling amount 208 prior to limits, protections and other adjustments that may be applied. The target fuelling amount 208 for the first fuel is referred to as "Minimum Diesel Required" in FIG. 4 because of the likely application where the target fuelling setpoint reference value 226 will be empirically or analytically determined to achieve the smallest quantity of diesel fuel that is required to maintain stable combustion or achieve other constraints. However, the embodiments discussed herein are not limited to diesel as the first fuel, nor are they constrained only to minimizing the quantity of the first fuel. Other fuels and controls objectives may be achieved by employing the control strategies described herein.

Charge air/fuel ratio adjustment sub-module 228 receives inputs of engine speed, intake manifold pressure, intake manifold temperature, and measured mass flow of the gaseous second fuel to determine a minimum fuelling amount 230 for a charge lambda adjustment for the target fuelling amount 208 of the first fuel based on an input that is indicative of the air-to-fuel ratio of the charge flow. The air-fuel ratio can be determined from virtual sensors, lambda sensors, RPM of the engine, intake manifold pressure, intake manifold temperature, exhaust pressure and/or exhaust temperature. Injector tip temperature adjustment sub-module 232 receives inputs of engine speed, intake manifold pressure, fuel rail pressure, and other inputs to determine a minimum fuelling amount 234 for an injector tip temperature adjustment for the target fuelling amount 208 of the first fuel to control injector tip temperature below predetermined limits. Knock adjustment sub-module 236 receives knock sensor inputs to determine a minimum fuelling amount 238 for a knock adjustment to the target fuelling amount 208 for the first fuel to control knock levels. Exhaust temperature adjustment sub-module 240 receives exhaust or aftertreatment system temperature inputs, such as exhaust gas temperatures, turbine inlet temperatures, turbine exit temperatures, or aftertreatment component temperatures, to determine a minimum fuelling amount 242 for an exhaust temperature adjustment to the target fuelling amount 208 in order to influence exhaust gas temperatures or modulate exhaust gas temperatures within predetermined limits.

Each of the setpoint 226 and adjustments from minimum fuelling amounts 230, 234, 238, 242 to target fuelling amount 208 are provided to a limits and protections sub-module 244 that applies limits and protections criteria to select the target fuelling amount 208, or to modify a selected target value, to apply to the target fuelling amount 208. The target fuelling amount 208 can be, for example, a rate, duration and/or quantity for injection of the first fuel, to satisfy predetermined limits and protections in providing the target fuelling amount 208 of the first fuel. A transient speed adjustment 246 is applied to the selected target value for the target fuelling amount 208 that is output from limits and protections sub-module 244 to respond to transient speed conditions of engine 30, if any, to modify the target value for target fuelling amount 208. The transient speed adjustment 246 can be employed to respond to transient conditions by modifying the target fuelling amount 208 to provide a more rapid response to transient conditions than could be obtained with modulating the flow rate of the second fuel. In one embodiment, for any given operating condition, the total fuel energy that is delivered to the engine is relatively constant while the flow rates of the first and second fuels are adjusted to drive the fuelling amount provided by the first fuel toward the target fuelling amount 208.

Figure 5:
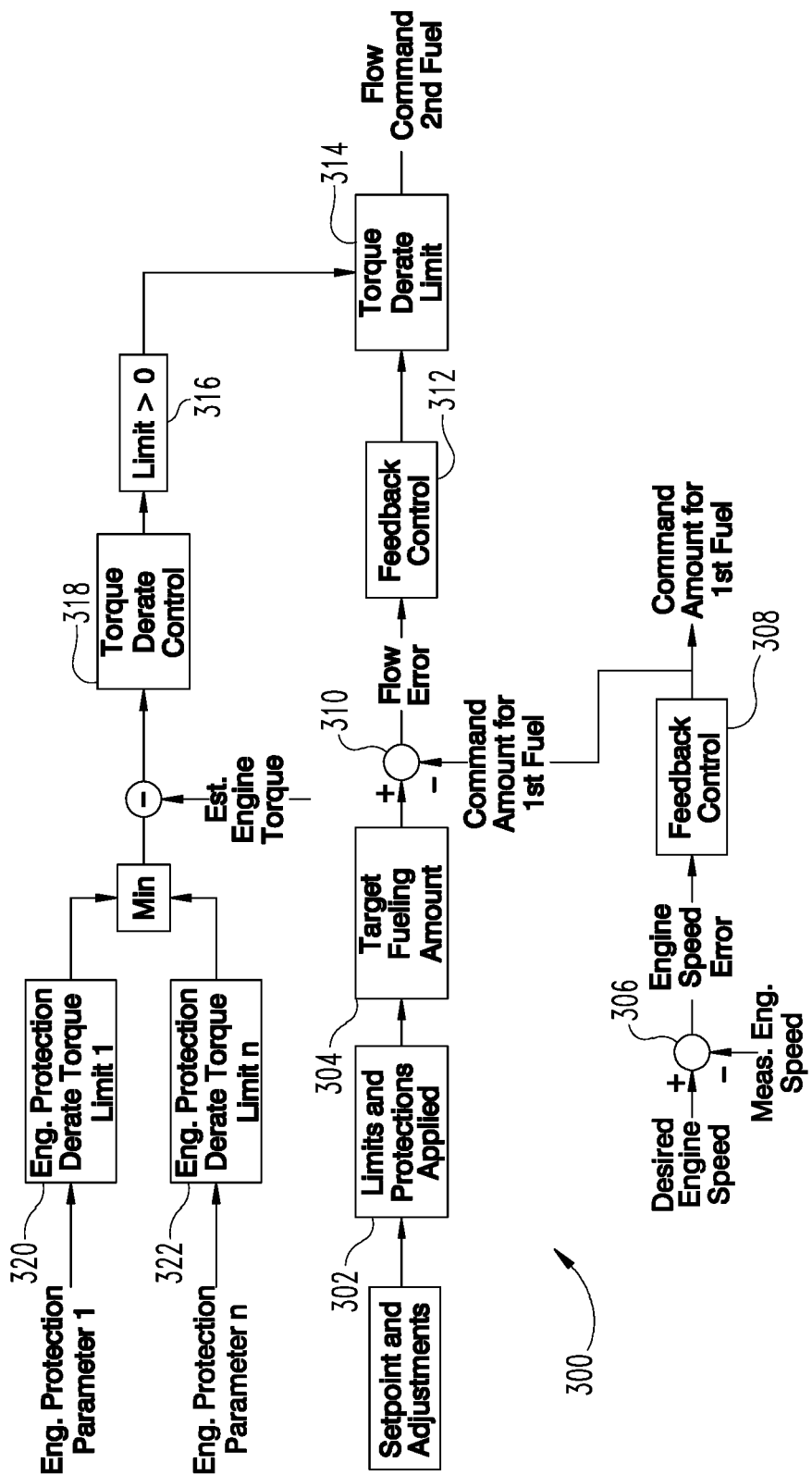
FIG. 5 is a schematic of another embodiment of a control apparatus for duel fuel operation of an internal combustion engine where the amount of the first fuel is modulated in response to engine performance while the flow rate of the second fuel is simultaneously adapted to bring the amount of the first fuel to a target value.

Referring to FIG. 5 another embodiment controller apparatus 300 is shown. Each of the setpoint 226 and adjustments in the minimum fuelling amounts 230, 234, 238, 242 are determined in a manner similar to controller apparatus 202 of FIG. 4 and are provided to a limits and protections sub-module 302 that applies limits and protections criteria to select the target fuelling amount 304 for the first fuel by computation and/or by a reference table based on operating parameters. In one embodiment the target fuelling amount 304 is selected without a transient adjustment, but a transient adjustment is not precluded. Controller apparatus receives inputs of desired engine speed and measured engine speed at summer 306 and determines an engine speed error that is provided to a feedback controller 308, which outputs a commanded fuelling amount for the first fuel. The commanded fuelling amount for the first fuel modulates the first fuel amount to respond to changes in engine performance. The commanded fuelling amount for the first fuel is provided to a summer 310 with the target fuelling amount 304 to determine a flow error between the commanded fuelling amount and the target fuelling amount 304 for the first fuel, which is provided to a gaseous fuel feedback controller 312 to determine a flow rate for the second fuel required to respond to the flow error. The gaseous fuel feedback controller 312 is output to a torque derate limit submodule 314. Torque derate limit submodule 314 also receives a torque derate limit input 316 from a torque derate control submodule 318 that arbitrates an estimated engine torque and various engine protection derate torque limits 320, 322 for various engine protection parameters. Torque derate limit submodule 314 outputs a flow command for the second fuel that drives the amount of the first fuel toward the target fuelling amount 304.

Various aspects for the systems, methods and apparatus disclosed herein are contemplated. For example, one aspect includes a method that comprises operating an internal combustion engine system including an intake system connected to an engine with at least one cylinder and at least two fuel sources operably connected to the internal combustion engine system to provide a liquid fuel to the at least one cylinder and a flow of a gaseous fuel to the engine. The intake system is coupled to the at least one cylinder to provide a charge in a combustion chamber of the at least one cylinder from a charge flow, and the internal combustion engine system further includes an exhaust system. The method includes modulating at least one of a speed and a torque of the engine by changing a fuelling amount of the liquid fuel to the at least one cylinder; determining a target fuelling amount of the liquid fuel based on at least one of a reference table and second operating parameters; and modulating a flow rate of the gaseous fuel to the engine in order to drive the changed fuelling amount of the liquid fuel toward the target fuelling amount.

In one embodiment, determining the target fuelling amount of the liquid fuel is based on at least one of a minimum engine speed to be provided by combustion of the liquid fuel and a measurement indicative of an air-to-fuel ratio of the charge flow. In another embodiment, the sensed operating parameters include one or more of an engine speed, a throttle position, a torque feedback, a torque estimation; an intake manifold pressure, and an ambient air pressure.

In one embodiment, the liquid fuel is diesel fuel and the gaseous fuel is natural gas. In another embodiment, the target fuelling amount is a minimum value. In a refinement of this embodiment, the minimum value is determined in response to the measurement indicative of the air-to-fuel ratio of the charge flow so that the minimum value provides auto-ignition of the liquid fuel upon compression in the cylinder and sufficient energy is released to ignite the charge in the cylinder. In another refinement, the minimum value is further determined based on engine operating conditions. In a further refinement, the engine operating conditions include at least one of an engine speed, the air-to-fuel ratio in the charge flow, an injector tip temperature (measured or inferred) of one or more injectors of the first fuel, a knock level, and an exhaust temperature.

In another embodiment of the method, modulating the flow rate of the gaseous fuel includes modulating the flow rate in response to a measured engine speed varying from a desired engine speed. In yet another embodiment, the target fuelling amount is at least one of a flow rate, an injection duration, injection pressure, and a quantity of the liquid fuel. In still another embodiment, the target fuelling amount is greater than a pilot injection amount for the liquid fuel. In another embodiment, the engine is operated in a lean condition while modulating the flow rate of the gaseous fuel to the engine.

According to another aspect, a method comprises operating an internal combustion engine with a first fuel from a first fuel source and a second fuel from a second fuel source, the second fuel and intake air forming a premixed charge flow to at least one cylinder of the internal combustion engine with an amount of the first fuel injected into the at least one cylinder corresponding to a target fuelling amount, the amount of the first fuel being auto-ignited upon compression of a charge in the at least one cylinder provided by the charge flow and sufficient energy is released to ignite the second fuel in the charge. The method includes responding to one of a speed change and a torque change of the internal combustion engine by varying the amount of the first fuel injected into the at least one cylinder from the target value and responding to the change in the amount of the first fuel injected by changing a flow rate of the second fuel into the intake air to drive the amount of the first fuel toward the target fuelling amount.

In one embodiment, a ratio of the intake air to the second fuel in the intake air is too lean to support combustion of the second fuel in the at least one cylinder without diffusion combustion of the first fuel in the at least one cylinder.

In another aspect, a method includes operating an internal combustion engine system including an intake system connected to an engine with at least one cylinder and at least two fuel sources operably connected to the internal combustion engine system to provide a liquid fuel to the at least one cylinder and a flow of a gaseous fuel to the engine. The intake system is coupled to the at least one cylinder to provide a charge in a combustion chamber of the at least one cylinder from a charge flow in the intake system. The internal combustion engine system further includes an exhaust system. The method further includes determining a desired torque and speed output of the engine; determining a minimum target fuelling amount of the liquid fuel based on at least one of a minimum engine speed to be provided by combustion of the liquid fuel and a measurement indicative of an air-to-fuel ratio of the charge flow; and modulating a flow rate of the gaseous fuel to the engine to drive the changed fuelling amount of the liquid fuel to the target fuelling amount while maintaining the desired torque and speed output of the engine.

According another aspect, a system is provided that includes an internal combustion engine with at least one cylinder having a combustion chamber. The at least one cylinder is configured to receive a charge flow from an intake system connected to the internal combustion engine and to produce an exhaust flow to an exhaust system connected to the internal combustion engine. The system includes at least two fuel sources operably connected to provide a liquid fuel to the at least one cylinder from a first fuel source and a flow of a gaseous fuel to the at least one cylinder from a second fuel source. The system also includes a controller configured to determine a target fuelling amount of the liquid fuel based on at least one of a minimum engine speed to be provided by combustion of the liquid fuel and a measurement indicative of an air-to-fuel ratio of the charge flow. The controller is further configured to modulate at least one of a speed and a torque of the engine by changing a fuelling amount of the liquid fuel from the first fuel source to the at least one cylinder and, in response, modulate a flow rate of the gaseous fuel to the engine to drive the changed fuelling amount of the liquid fuel toward the target fuelling amount.

In one embodiment, the liquid fuel is diesel fuel and the gaseous fuel is natural gas. In another embodiment, the controller is configured to determine the target fuelling amount as a minimum value in response to the measurement indicative of the air-to-fuel ratio of the charge flow, the minimum value providing auto-ignition of the liquid fuel upon compression of a charge in the at least one cylinder provided by the charge flow and sufficient energy release to ignite the charge in the at least one cylinder. In a refinement of this embodiment, the minimum value is further determined based on engine operating conditions that include at least one of an engine speed, the air-to-fuel ratio of the charge flow, an injector tip temperature of one or more injectors of the first fuel, a knock level of the internal combustion engine, and an exhaust temperature.

In another embodiment, the controller is configured to modulate the flow rate of the gaseous fuel in response to a measured engine speed varying from a desired engine speed. In yet another embodiment, the target fuelling amount is at least one of a flow rate, an injection duration, an injection pressure, and a quantity of the liquid fuel, and the target fuelling amount is greater than a pilot injection amount for the liquid fuel.

According to another aspect, a system is provided that includes an internal combustion engine with at least one cylinder having a combustion chamber. The at least one cylinder is configured to receive a charge flow from an intake system connected to the internal combustion engine and to produce an exhaust flow to an exhaust system connected to the internal combustion engine. The system includes at least two fuel sources operably connected to provide a liquid fuel to the at least one cylinder from a first fuel source and a flow of a gaseous fuel to the at least one cylinder from a second fuel source. The second fuel and intake air form a premixed charge in the at least one cylinder of the internal combustion engine with a target fuelling amount of the first fuel injected into the at least one cylinder, the target amount of the first fuel being auto-ignited upon compression of the charge in the at least one cylinder with sufficient energy release to ignite the second fuel in the charge. The system also includes a controller configured respond to a change in the amount of the first fuel injected by changing a flow rate of the second fuel into the intake air to drive the first fuel toward the target fuelling amount.

In one embodiment, the controller is configured to respond to one of a speed change and a torque change of the internal combustion engine by changing the amount of the first fuel injected into the at least one cylinder from the target fuelling amount. In another embodiment, a ratio of the intake air to the amount of second fuel is too lean to support combustion of the second fuel in the at least one cylinder without diffusion combustion of the first fuel in the at least one cylinder. In another embodiment, the first fuel source is connected to the at least one cylinder via a direct injector and the second fuel source is connected to the intake system upstream of the at least one cylinder. In a refinement of this embodiment, the second fuel source is connected at or upstream of an inlet of a compressor in the intake system. In another embodiment, the first fuel is a liquid fuel and the second fuel is a gaseous fuel. In yet another embodiment, the first fuel is diesel fuel and the second fuel is natural gas.

While the invention has been illustrated and described in detail in the drawings and foregoing description, the same is to be considered as illustrative and not restrictive in character, it being understood that only certain example embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
operating an internal combustion engine system including an intake system connected to an engine with at least one cylinder and at least two fuel sources operably connected to the internal combustion engine system to provide a liquid fuel to the at least one cylinder and a flow of a gaseous fuel to the engine, wherein the intake system is coupled to the at least one cylinder to provide a charge in a combustion chamber of the at least one cylinder from a charge flow, the internal combustion engine system further including an exhaust system;
modulating at least one of a speed and a torque of the engine to a corresponding desired speed and desired torque by only changing a fuelling amount of the liquid fuel to the at least one cylinder;
determining a target fuelling amount for the liquid fuel based on at least one of a reference table and sensed engine operating parameters; and
modulating a flow rate of the gaseous fuel to the engine to drive the changed fuelling amount of the liquid fuel toward the target fuelling amount while maintaining at least one of the desired speed and the desired torque of the engine.

2. The method of claim 1, wherein the liquid fuel is diesel fuel and the gaseous fuel is natural gas.

3. The method of claim 1, wherein the target fueling amount is a minimum value.

4. The method of claim 3, wherein the minimum value is determined in response to a measurement indicative of an air-to-fuel ratio of the charge flow, the minimum value providing auto-ignition of the liquid fuel upon compression in the cylinder and sufficient energy release to ignite the charge in the cylinder.

5. The method of claim 3, wherein the minimum value is further determined based on the sensed engine operating parameters.

6. The method of claim 5, wherein the engine operating parameters include at least one of an engine speed, the air-to-fuel ratio in the charge flow, an injector tip temperature of one or more injectors of the first fuel, a knock level, and an exhaust temperature.

7. The method of claim 1, wherein modulating the flow rate of the gaseous fuel includes modulating the flow rate in response to changing the fuelling amount of the liquid fuel in response to a measured engine speed varying from a desired engine speed.

8. The method of claim 1, wherein the target fuelling amount is at least one of a flow rate, an injection duration, an injection pressure, and a quantity of the liquid fuel.

9. The method of claim 1, wherein the target fuelling amount is greater than a pilot injection amount for the liquid fuel.

10. The method of claim 1, wherein the engine is operated in a lean condition while modulating the flow rate of the gaseous fuel to the engine.

11. The method of claim 1, wherein determining the target fuelling amount of the liquid fuel is based on at least one of a minimum engine speed to be provided by combustion of the liquid fuel and a measurement indicative of an air-to-fuel ratio of the charge flow.

12. The method of claim 1, wherein the sensed engine operating parameters include one or more of an engine speed, a throttle position, a torque feedback, a torque estimation, an intake manifold pressure, and an ambient air pressure.

13. A method, comprising:
operating an internal combustion engine with a first fuel from a first fuel source and a second fuel from a second fuel source, the second fuel and intake air forming a premixed charge flow into at least one cylinder of the internal combustion engine with an amount of the first fuel injected into the at least one cylinder corresponding to a target fuelling amount, the amount of the first fuel being auto-ignited upon compression of a charge provided by the charge flow into the at least one cylinder and release energy sufficient to ignite the second fuel in the charge;
responding to one of a speed change and a torque change of the internal combustion engine by varying only the amount of the first fuel injected into the at least one cylinder from the target fuelling amount; and
responding to the change in the amount of the first fuel injected by changing a flow rate of the second fuel into the intake air to drive the amount of the first fuel toward the target fuelling amount.

14. The method of claim 13, wherein a ratio of the intake air to the second fuel in the intake air is too lean to support combustion of the second fuel in the at least one cylinder without diffusion combustion of the first fuel in the at least one cylinder.

15. A system, comprising:
an internal combustion engine including at least one cylinder with a combustion chamber, the at least one cylinder being configured to receive a charge flow from an intake system connected to the internal combustion engine and to produce an exhaust flow to an exhaust system connected to the internal combustion engine;
at least two fuel sources operably connected to provide a liquid fuel to the at least one cylinder from a first fuel source and a flow of a gaseous fuel to the at least one cylinder from a second fuel source; and
a controller configured to determine a target fuelling amount of the liquid fuel based on at least one of a reference table and sensed engine operating parameters, the controller further being configured to modulate at least one of a speed and a torque of the engine by only changing a fuelling amount of the liquid fuel from the first fuel source to the at least one cylinder and, in response, modulate a flow rate of the gaseous fuel to the engine to drive the changed fuelling amount of the liquid fuel toward the target fuelling amount.

16. The system of claim 15, wherein the liquid fuel is diesel fuel and the gaseous fuel is natural gas.

17. The system of claim 15, wherein the controller is configured to determine the target fuelling amount as a minimum value in response to an air-to-fuel ratio of the charge flow, the minimum value providing auto-ignition of the liquid fuel upon compression of a charge provided in the at least one cylinder from the charge flow and sufficient energy release to ignite the charge in the at least one cylinder.

18. The system of claim 17, wherein the minimum value is further determined based on engine operating conditions that include at least one of an engine speed, the air-to-fuel ratio of the charge flow, an injector tip temperature of one or more injectors of the first fuel, a knock level of the internal combustion engine, and an exhaust temperature.

19. The system of claim 15, wherein the controller is configured to modulate the flow rate of the gaseous fuel in response to a measured engine speed varying from a desired engine speed.

20. The system of claim 15, wherein:
the target fuelling amount is at least one of a flow rate, an injection duration, an injection pressure, and a quantity of the liquid fuel; and
the target fuelling amount is greater than a pilot injection amount for the liquid fuel.

21. The method of claim 15 wherein the sensed engine operating parameters include one or more of an engine speed, a throttle position, a torque feedback, a torque estimation; an intake manifold pressure, and an ambient air pressure.

22. A system, comprising:
an internal combustion engine including at least one cylinder with a combustion chamber, the at least one cylinder being configured to receive a charge flow from an intake system connected to the internal combustion engine and to produce an exhaust flow to an exhaust system connected to the internal combustion engine;
at least two fuel sources operably connected to provide a liquid fuel to the at least one cylinder from a first fuel source and a flow of a gaseous fuel to the at least one cylinder from a second fuel source, the second fuel and intake air forming a premixed charge in the at least one cylinder of the internal combustion engine with a target amount of the first fuel injected into the at least one cylinder, the target amount of the first fuel being auto-ignited upon compression of the charge in the at least one cylinder with sufficient energy release to ignite the second fuel in the charge; and
a controller configured to change an amount of the first fuel injected by changing a flow rate of the second fuel into the intake air to drive the first fuel toward the target amount, wherein the controller is further configured to respond to one of a speed change and a torque change of the internal combustion engine by changing the amount of the first fuel injected into the at least one cylinder from the target amount.

23. The system of claim 22, wherein a ratio of the intake air to the amount of second fuel is too lean to support combustion of the second fuel in the at least one cylinder without diffusion combustion of the first fuel in the at least one cylinder.

24. The system of claim 22, wherein the first fuel source is connected to the at least one cylinder via a direct injector and the second fuel source is connected to the intake system upstream of the at least one cylinder.

25. The system of claim 24, wherein the second fuel source is connected at or upstream of an inlet of a compressor in the intake system.

26. The system of claim 22, wherein the first fuel is a liquid fuel and the second fuel is a gaseous fuel.

27. The system of claim 22, wherein the first fuel is diesel fuel and the second fuel is natural gas.

* * * * *